US006831839B2

(12) United States Patent
Bovell

(10) Patent No.: US 6,831,839 B2
(45) Date of Patent: Dec. 14, 2004

(54) ADJUSTABLE SLED MODULE FOR MASS STORAGE DEVICES

(75) Inventor: Eric T. Bovell, Branford, CT (US)

(73) Assignee: Netezza Corporation, Framingham, MA (US)

( * ) Notice: Subject to any disclaimer, the term of this patent is extended or adjusted under 35 U.S.C. 154(b) by 0 days.

(21) Appl. No.: 10/090,119

(22) Filed: Feb. 28, 2002

(65) Prior Publication Data

US 2003/0161116 A1 Aug. 28, 2003

(51) Int. Cl.[7] .................................................. H05K 1/14
(52) U.S. Cl. ....................... 361/742; 361/740; 361/758; 361/770; 361/801; 361/804; 361/809
(58) Field of Search ................................ 361/683–685, 361/742, 758, 770, 940, 804, 724–731, 740, 741, 747, 756, 759, 801, 802, 686, 728, 736, 748, 752, 807, 809; 439/928.1, 173

(56) References Cited

U.S. PATENT DOCUMENTS

| 4,982,303 A | 1/1991 | Krenz ........................ 360/137 |
| 5,483,419 A | 1/1996 | Kaczeus, Sr. et al. ...... 361/685 |
| 5,488,538 A | 1/1996 | Wakita |
| 5,757,617 A | 5/1998 | Sherry |
| 5,986,881 A | 11/1999 | Yang |
| 6,201,692 B1 | 3/2001 | Gamble et al. |
| 6,297,951 B1 | 10/2001 | Lee |

*Primary Examiner*—Phuong T. Vu
(74) *Attorney, Agent, or Firm*—Hamilton, Brook, Smith & Reynolds, P.C.

(57) ABSTRACT

An adjustable circuit sled module for a mass storage device has a housing, a mass storage device, a circuit board, a cover and spacers. The spacers position the mass storage device to align the power and data interface ports of the mass storage device with corresponding power and data interface connectors of the circuit board. The resulting sled module can be adjusted to accommodate a variety of brands and sizes of mass storage devices.

16 Claims, 5 Drawing Sheets

ADJUSTABLE SLED MODULE FOR MASS STORAGE DEVICES

BACKGROUND OF THE INVENTION

The present invention relates generally to arrays of circuit board modules and more particularly to subassemblies in such arrays. In a typical electronic component assembly, one or more trays are used to house a plurality of circuit boards or sled modules. An example of such an array contains many circuit sled modules that each hold one or more mass storage devices such as hard disk drives (HDD). Such arrays are often used to implement large-scale database applications. A typical sled module has a chassis or housing to which a HDD is mounted, the HDD, a circuit board, and a front panel. The ends of such a circuit sled module typically contain mating connectors which mate with corresponding mating input/output connectors at the back end of the tray. The circuit board may also contain a connector which mates to the interface on the back of the HDD.

Because HDDs come in non-standard sizes and formats, one circuit sled module with a mechanically fixed housing and fixed input/output ports on the circuit board cannot accommodate many different types and brands of HDDs. It is desirable that the HDD data interface port and power port mate directly with the corresponding ports on the circuit board so that cables to connect the ports are not needed, thus reducing the size and number of parts of the sled module. However, the data interface and power ports of the various brands and types of HDDs are not all in the exact same place and the thicknesses of the HDDs vary as well. Thus, it is desirable to have a circuit sled module which can adjust to accommodate HDDs with a variety of data interface and power port positions without the need for interface and power cables connecting the HDD and the circuit board.

SUMMARY OF THE INVENTION

The present invention is a circuit sled module for a mass storage device which adjusts as necessary to fit a variety of brands and sizes of mass storage devices. The adjustments are made through the use of spacers on either side of the mass storage device and a hole in the cover of the sled module. The result is a sled module which has a circuit board which can mate its power supply and data interface connectors directly to the power supply and data interface ports on a variety of mass storage devices without the need for data or power cables, thus minimizing the size of the sled module and number of parts needed to produce it.

The sled module for a mass storage devices comprises a housing or chassis, a mass storage device, a circuit board, spacers which position the mass storage device, and a cover. The mass storage device can be a hard disk drive, recordable or re-writable CD-ROM drive, recordable or re-writable DVD drive, or any other form of mass storage. The mass storage device can have a data interface port and a power supply port and the circuit board can have a corresponding data interface connector and a power supply connector. The spacers can be positioned on either side of the mass storage device, thereby aligning the ports on the mass storage device with the corresponding connectors on the circuit board. The cover of the sled module can have a hole in it which allows for mass storage devices of different heights.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Although the circuit sled module of the present invention can be implemented with a variety of mass storage devices, the following description and accompanying drawings show an embodiment of the invention in which the mass storage device is a common hard disk drive (HDD). It is understood that current technologies such as recordable/re-writable CD-ROM drives, recordable/re-writable DVD drives, digital tape drives, NAS devices, or even flash RAM cards and the like, can be adapted to be used with the circuit sled module of the current invention.

Figure 1:
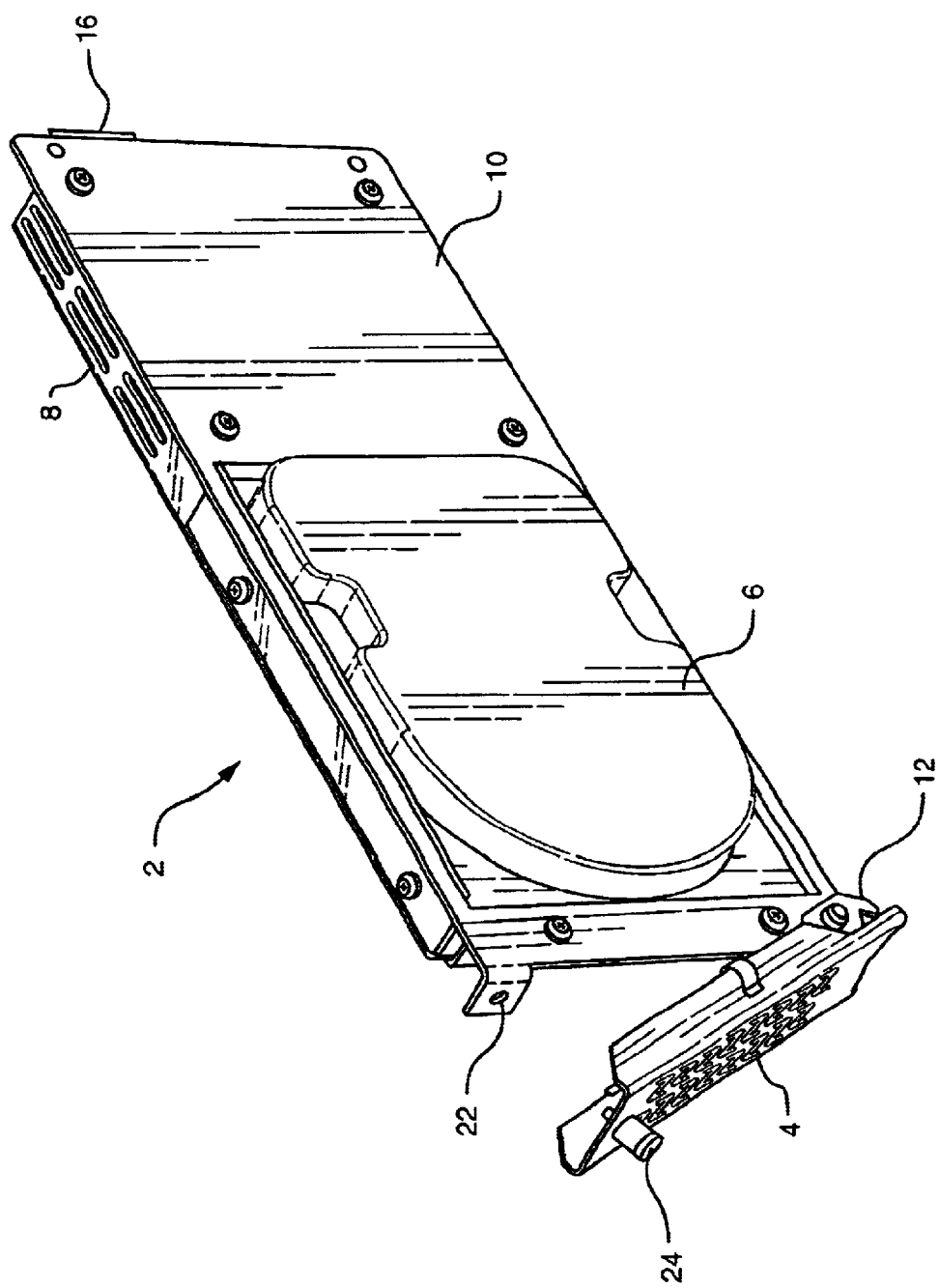
FIG. 1 is a perspective view of a circuit sled module for a HDD.
Figure 2:
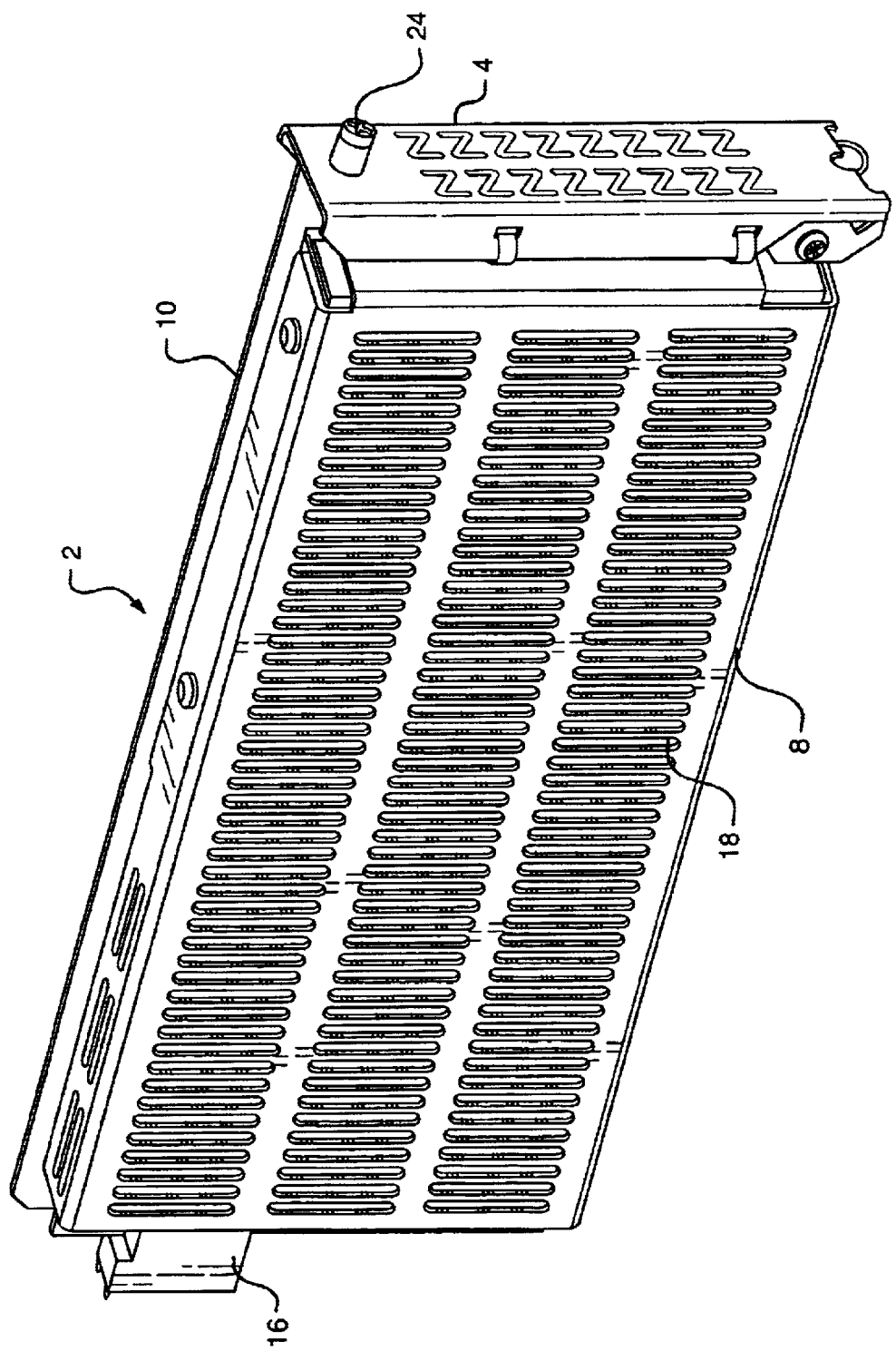
FIG. 2 is a perspective view of a circuit sled module for a HDD.

FIGS. 1 and 2 show perspective views of a circuit sled module 2 from the front right and front left, respectively. The basic external components of the circuit sled module 2 comprise a housing or chassis 8, a cover 10, a front panel 4, and a mating connector 16. The housing 8 may contain vents 18 which allow air to circulate to the internal components of the sled module 2.

Figure 3:
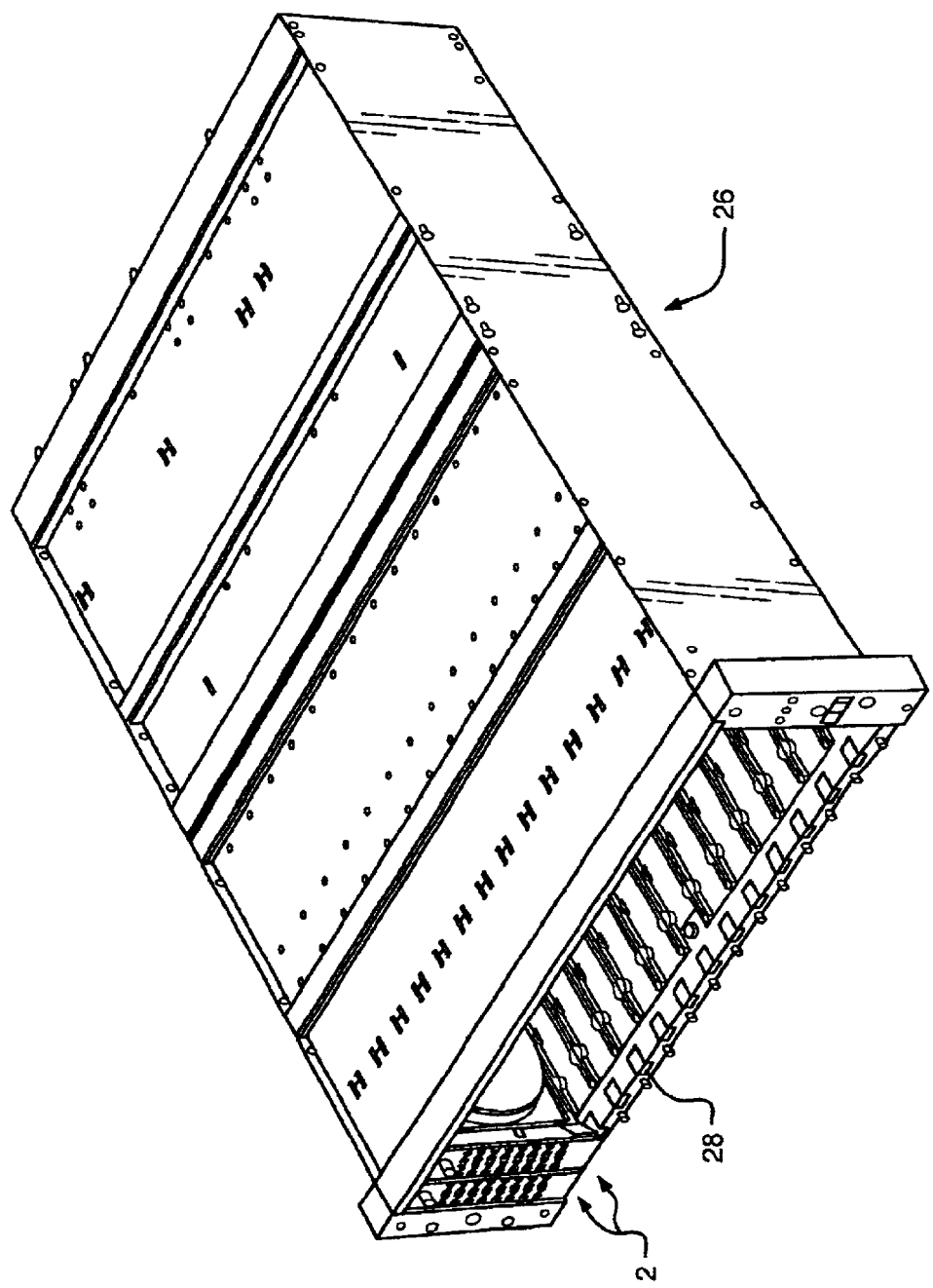
FIG. 3 shows a tray with two circuit sled modules mounted within it.

FIG. 3 shows a tray 26 for receiving an array of sled modules 2. When a sled module 2 is inserted into the tray 26, the mating connector 16 in the back of the sled module 2 mates with a corresponding port (not shown) in the back of the tray 26. The tray can have a catch or lip 28 which receives hooks 12 on the bottom of the front panel 4. The hooks 12 can assist in providing leverage for inserting the mating connector 16 into the corresponding port in the back of the tray as well as lock the sled module 2 in place.

Figure 4:
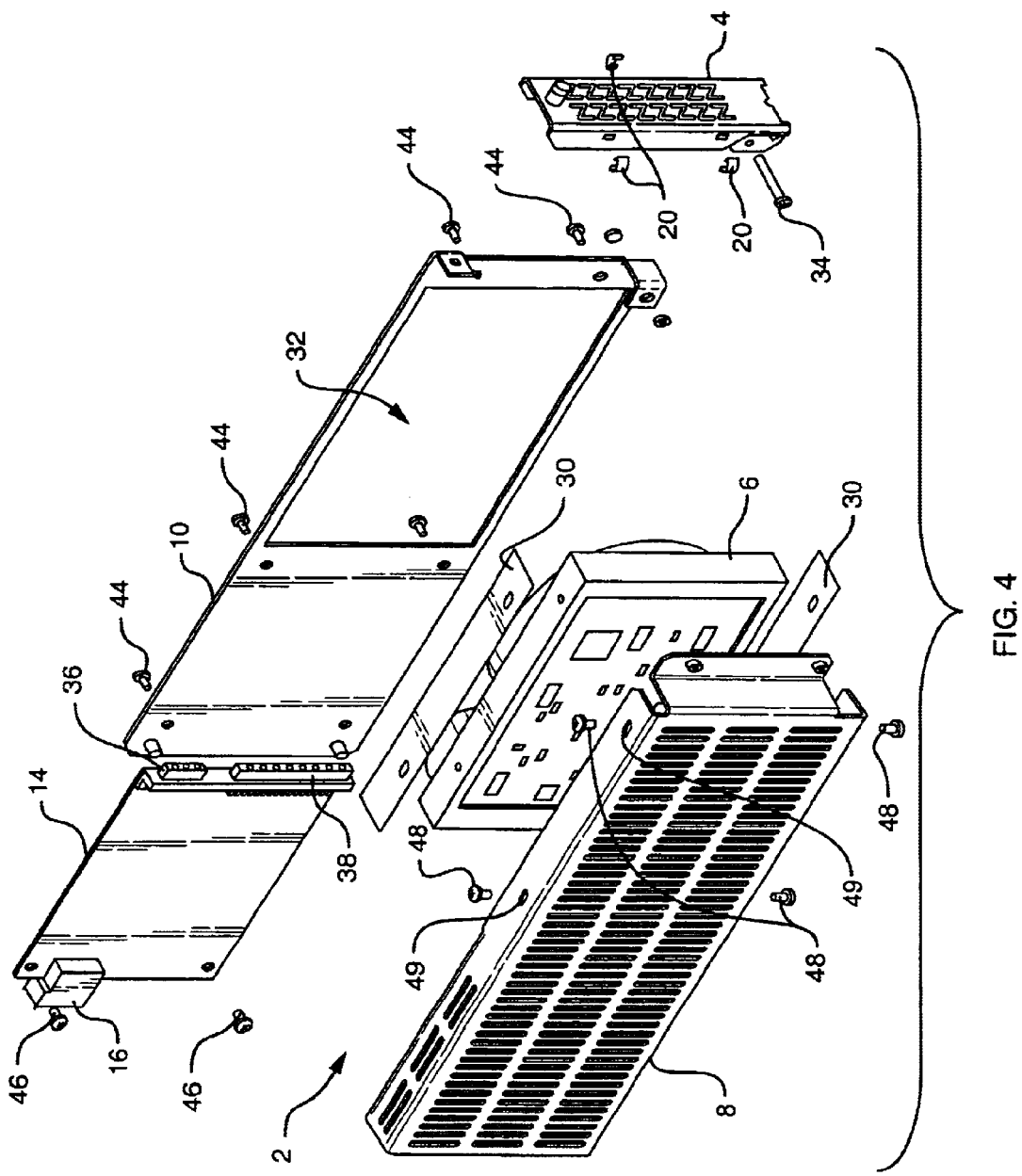
FIG. 4 is an exploded perspective view of a circuit sled module for a HDD.
Figure 5:
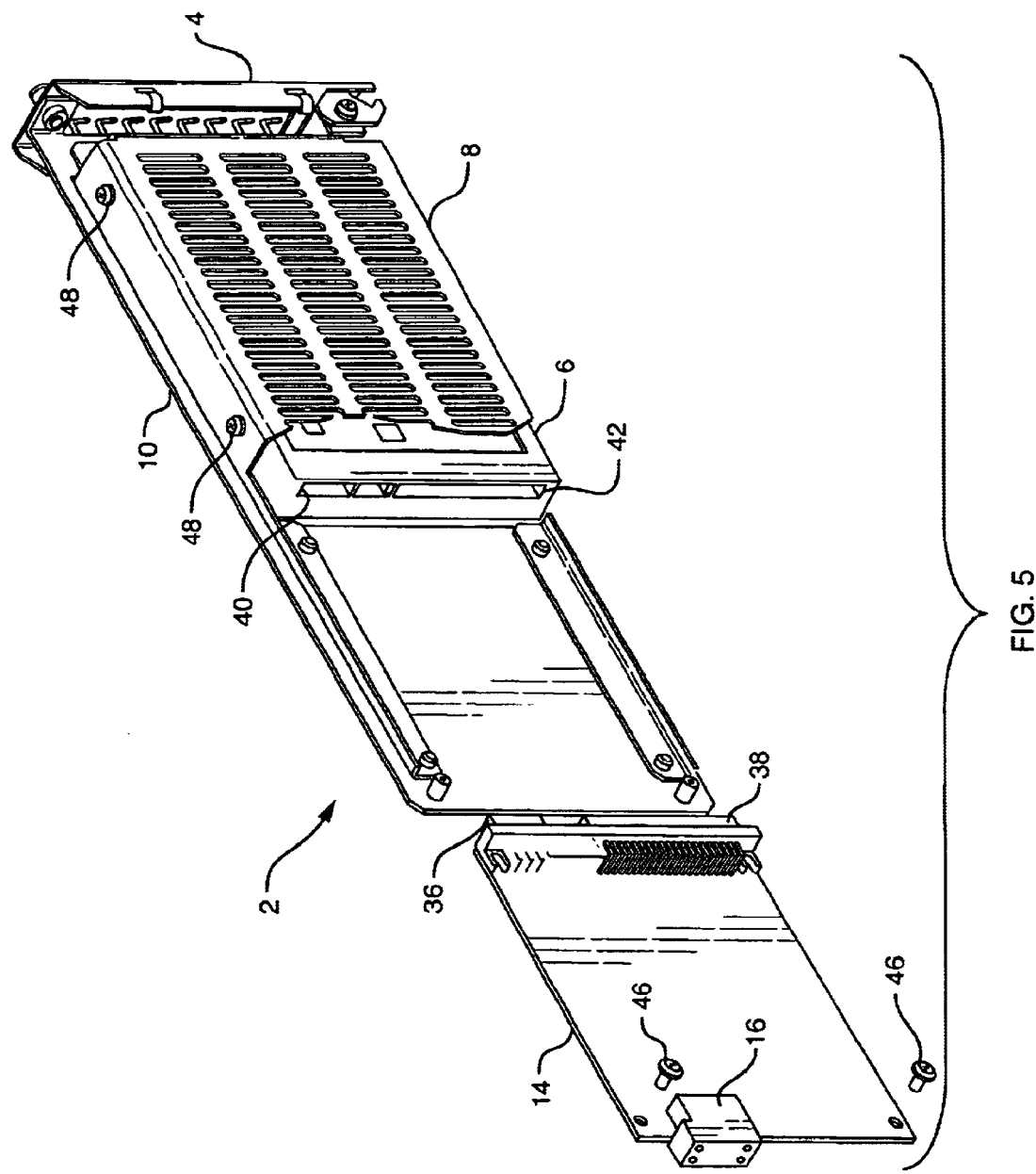
FIG. 5 is a cut away view of a circuit sled module for a HDD with the circuit board removed from the sled housing.

FIG. 4 shows an exploded view of a circuit sled module 2. FIG. 5 shows a cut-away view of the sled module 2 viewed from the rear. In FIG. 5, a portion of the housing has been cut away so that ports on the HDD 6 can be seen. These figures will be discussed together.

The HDD 6 is mounted in the front portion of the housing 8. Screws 48 secure the HDD 6 in place when it is in position. The screws 48 are fed through slotted holes 49. This permits the module to adapt to HDDs having slightly different mounting hole positions.

The back of the HDD 6 has a port 40 for receiving a power supply and a port 42 for receiving a data interface. In a standard desktop computer housing, these ports are typically connected to the power supply or HDD controller card via flexible cables. In the present application, it is desirable to mate these ports 40 and 42 directly with the corresponding power supply connector 36 and data interface connector 38 to eliminate the need for cables. However, the exact location on the back of the HDD 6 of the power supply port 40 and data interface port 42 is not standard across the variety of HDD brands available. A goal of the present invention is to be able to accommodate a variety of HDDs with a variety of port locations.

Spacers 30 placed on either side of HDD 6 allow the HDD 6 to be located in a variety of positions in the vertical direction. Any number of spacers 30 can be used and they can be different thicknesses so as to fine tune the positioning of the HDD 6. The housing 8 is large enough to allow the HDD 6 to be secured in a variety of vertical positions. For example, if a particular HDD has power 40 and data interface 42 ports that are three millimeters closer to the top of the sled module than normal, then the necessary number and thickness of spacers 30 can be placed below and above the HDD 6 so as to position the HDD 6 three millimeters closer to the bottom of the sled module, thus resulting in the ports 40 and 42 being properly aligned to mate with the power 36 and data interface 38 connectors on circuit board 14. The spacers 30 can be made of virtually any material including plastic, rubber, and metal. However, plastic and rubber are desirable materials in that their compressibility allows for additional flexibility in placement of the HDD.

Additional flexibility is proved by the hole 32 in the cover 10 of the sled module 2. Since not all manufacturers make their HDDs the same "height" (or width, as the HDDs are oriented on their sides in the present drawings), the hole 32 in the cover 10 allows the HDD to extend as far as it needs outside of the sled module 2. Thus, there is no "height" restriction as a result of the sled module 2 itself.

An advantage of this design is that it allows all of the components of the sled module 2 to be uniform, regardless of what type of HDD 6 is used. All that needs to be adjusted for HDDs of different formats is the number, thickness and location of the spacers 30. Differences in heights are automatically provided for by the hole 32 in the cover 10.

Assembly of the sled module 2 is as follows. First, a determination is made of the number, thickness and location of spacers needed. The spacers 30 and HDD 6 are then placed within the housing 8 and screws 48 secure the HDD 6 and spacers 30 in place. The circuit board 14 is then slid in through the back of the housing 8. The power supply 36 and data interface 38 connectors on the circuit board 14 mate with their corresponding power supply 40 and data interface 42 ports on the HDD 6. The cover 10 is then aligned on the side of the housing 8 and screws 44 are fastened to secure the cover 10 to the housing 8. Screws 46 are then inserted through the circuit board 14 and fastened to the cover 10, thus securing the circuit board 14 in place. Lastly, the front panel 4 is secured to the sled module 2 with a pin or rod 34 which allows the front panel 4 to rotate around the rod 34 as needed during insertion and extraction of the sled module 2 from a tray 26.

While this invention has been particularly shown and described with references to preferred embodiments thereof, it will be understood by those skilled in the art that various changes in form and details may be made therein without departing from the scope of the invention encompassed by the appended claims.

What is claimed is:

1. A sled module for a muss storage device comprising:
    a housing;
    a circuit board mounted to a portion of the housing, the circuit board having an end mounted signal connector;
    a mass storage device having an enclosure and a signal connector; and
    spacers positioning the mass storage device within the housing at a position juxtaposed with respect to the circuit board such that the signal connector on the circuit board and the signal connector on the mass storage device are aligned with one another, the spacers thus permitting the sled module to mate directly without an intervening signal cable with mass storage devices having signal connectors with different positional configurations.

2. The sled module of claim 1 additionally comprising:
    a cover, wherein the cover has a hole for allowing the mass storage device to protrude through the cover when in its mounted position.

3. The sled module of claim 1 wherein the muss storage device has a data interface port and a power supply port and the circuit board has a data interface connector and a power supply connector.

4. The sled module of claim 3 wherein the spacers position the mass storage device such that the data interface and power supply ports on the mass storage device mate with data interface and power supply connectors on the circuit board.

5. The sled module of claim 1 wherein the mass storage device is a hard disk drive.

6. The sled module of claim 1 wherein the mass storage device is selected from the group consisting of CD-ROM drive, DVD drive, or digital tape drive.

7. The sled module of claim 1 wherein the spacers are wade of plastic.

8. The sled module of claim 1 wherein the spacers arc made of rubber.

9. The sled module of claim 1 wherein the spacers are made of a flexible material.

10. The sled module of claim 1 wherein the spacers are made of a compressible material.

11. A method for mounting a mass storage device having an enclosure and a signal connector comprising:
    providing a sled module comprising a housing, a circuit board mounted to a portion of the housing, the circuit board having an end mounted signal connector;
    positioning spacers within the housing such that the mass storage device, when inserted into the housing, is positioned with respect to the circuit board such that the signal connector on the circuit board and the signal connector on the mass storage device are aligned with one another, the spacers thus permitting the sled module to mate directly without an intervening signal cable with mass storage devices having control signal connectors with different positional configurations; and
    inserting the mass storage device within the housing.

12. The method of claim 11 wherein the mass storage device is a hard disk drive.

13. The method of claim 11 wherein the spacers are made of plastic.

14. The method of claim 11 wherein the spacers are made of rubber.

15. The method of claim 11 wherein the spacers are made of a flexible material.

16. The method of claim 11 wherein the spacers are made of a compressible material.

* * * * *

UNITED STATES PATENT AND TRADEMARK OFFICE
CERTIFICATE OF CORRECTION

PATENT NO. : 6,831,839 B2
APPLICATION NO. : 10/090119
DATED : December 14, 2004
INVENTOR(S) : Eric T. Bovell It is certified that error appears in the above-identified patent and that said Letters Patent is hereby corrected as shown below:

Column 3
Claim 1, line 62, delete "muss" and insert -- mass --.

Column 4
Claim 3, line 17, delete "muss" and insert -- mass --.
Claim 7, line 32, delete "wade" and insert -- made --.
Claim 8, line 33, delete "arc" and insert -- are --.

Signed and Sealed this

Sixth Day of February, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,831,839 B2 | Page 1 of 1 |
| APPLICATION NO. | : 10/090119 | |
| DATED | : December 14, 2004 | |
| INVENTOR(S) | : Eric T. Bovell | |

It is certified that error appears in the above-identified patent and that said Letters Patent is hereby corrected as shown below:

In the Drawings:

In Fig. 1, Sheet 1, remove reference numeral "6".

In Fig. 1, Sheet 1, remove reference numeral "22".

In Fig. 1, Sheet 1, remove reference numeral "24".

In Fig. 2, Sheet 2, remove reference numeral "24".

In Fig. 4, Sheet 4, remove reference numeral "20".

Signed and Sealed this
Twenty-seventh Day of May, 2014

Michelle K. Lee
*Deputy Director of the United States Patent and Trademark Office*